US005772236A

United States Patent [19]
Clark

[11] Patent Number: 5,772,236
[45] Date of Patent: Jun. 30, 1998

[54] FOLDABLE LAUNDRY CART

[76] Inventor: Annette Clark, R.R. 3, Box 204, Booneville, Miss. 38829

[21] Appl. No.: 812,344

[22] Filed: Mar. 5, 1997

[51] Int. Cl.$^6$ ........................................ B62B 3/02
[52] U.S. Cl. ...................... 280/651; 280/47.35; 280/43
[58] Field of Search ............................ 280/639, 38, 641, 280/651, 659, 47.35, 79.2, 43, 47.34

[56] References Cited

U.S. PATENT DOCUMENTS

| 2,615,593 | 10/1952 | Wolforth | 280/651 |
| 3,827,708 | 8/1974 | Derry | 280/657 |
| 4,969,656 | 11/1990 | Clausen | 280/79.2 |
| 5,048,857 | 9/1991 | Stevens | 280/651 |

FOREIGN PATENT DOCUMENTS

| 418279 | 1/1965 | Switzerland | 280/651 |

Primary Examiner—Richard M. Camby

[57] ABSTRACT

A new Foldable Laundry Cart for offering a convenient means for storing, transporting, and folding laundry. The inventive device includes a frame assembly having an opening therein, a basket fitted within the opening of the frame assembly, and first and second leg assemblies pivotally attached to opposite ends of the frame assembly, wherein the leg assemblies are foldable toward each other to a horizontal position adjacent the underside of the frame assembly whereby the cart can be easily stored when not in use. A tray assembly is swivelly attached to the frame assembly above the opening and a handle assembly extends from each end of the frame assembly wherein the handle assembly is adapted for use as a handle and a clothes hanging device.

13 Claims, 4 Drawing Sheets

FOLDABLE LAUNDRY CART

BACKGROUND OF THE INVENTION

1. Field of the Invention

The present invention relates to laundry carts and baskets and more particularly pertains to a new Foldable Laundry Cart for offering a convenient means for storing, transporting, and folding laundry.

2. Description of the Prior Art

The use of laundry carts and baskets is known in the prior art. More specifically, laundry carts and baskets heretofore devised and utilized are known to consist basically of familiar, expected and obvious structural configurations, notwithstanding the myriad of designs encompassed by the crowded prior art which have been developed for the fulfillment of countless objectives and requirements.

Known prior art laundry carts and baskets include U.S. Pat. Nos. 4,986,555; 4,549,748; D348,128; 5,294,009; 4,948,077; D244,173; and 4,781,300.

While these devices fulfill their respective, particular objectives and requirements, the aforementioned patents do not disclose a new Foldable Laundry Cart. The inventive device includes a frame assembly having an opening therein, a basket fitted within the opening of the frame assembly, and first and second leg assemblies pivotally attached to opposite ends of the frame assembly, wherein the leg assemblies are foldable toward each other to a horizontal position adjacent the underside of the frame assembly whereby the cart can be easily stored when not in use. A tray assembly is swivelly attached to the frame assembly above the opening and a handle assembly extends from each end of the frame assembly wherein the handle assembly is adapted for use as a handle and a clothes hanging device.

In these respects, the Foldable Laundry Cart according to the present invention substantially departs from the conventional concepts and designs of the prior art, and in so doing provides an apparatus primarily developed for the purpose of offering a convenient means for storing, transporting, and folding laundry.

SUMMARY OF THE INVENTION

In view of the foregoing disadvantages inherent in the known types of laundry carts and baskets now present in the prior art, the present invention provides a new Foldable Laundry Cart construction wherein the same can be utilized for offering a convenient means for storing, transporting, and folding laundry.

The general purpose of the present invention, which will be described subsequently in greater detail, is to provide a new Foldable Laundry Cart apparatus and method which has many of the advantages of the laundry carts and baskets mentioned heretofore and many novel features that result in a new Foldable Laundry Cart which is not anticipated, rendered obvious, suggested, or even implied by any of the prior art laundry carts and baskets, either alone or in any combination thereof.

To attain this, the present invention generally comprises a frame assembly having an opening therein, a basket fitted within the opening of the frame assembly, and first and second leg assemblies pivotally attached to opposite ends of the frame assembly, wherein the leg assemblies are foldable toward each other to a horizontal position adjacent the underside of the frame assembly whereby the cart can be easily stored when not in use. A tray assembly is swivelly attached to the frame assembly above the opening and a handle assembly extends from each end of the frame assembly wherein the handle assembly is adapted for use as a handle and a clothes hanging device.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Foldable Laundry Cart apparatus and method which has many of the advantages of the laundry carts and baskets mentioned heretofore and many novel features that result in a new Foldable Laundry Cart which is not anticipated, rendered obvious, suggested, or even implied by any of the prior art laundry carts and baskets, either alone or in any combination thereof.

It is another object of the present invention to provide a new Foldable Laundry Cart which may be easily and efficiently manufactured and marketed.

It is a further object of the present invention to provide a new Foldable Laundry Cart which is of a durable and reliable construction.

An even further object of the present invention is to provide a new Foldable Laundry Cart which is susceptible of a low cost of manufacture with regard to both materials and labor, and which accordingly is then susceptible of low prices of sale to the consuming public, thereby making such Foldable Laundry Cart economically available to the buying public.

Still yet another object of the present invention is to provide a new Foldable Laundry Cart which provides in the apparatuses and methods of the prior art some of the advantages thereof, while simultaneously overcoming some of the disadvantages normally associated therewith.

Still another object of the present invention is to provide a new Foldable Laundry Cart for offering a convenient means for storing, transporting, and folding laundry.

Yet another object of the present invention is to provide a new Foldable Laundry Cart which includes a frame assembly having an opening therein, a basket fitted within the opening of the frame assembly, and first and second leg assemblies pivotally attached to opposite ends of the frame assembly, wherein the leg assemblies are foldable toward each other to a horizontal position adjacent the underside of the frame assembly whereby the cart can be easily stored when not in use. A tray assembly is swivelly attached to the frame assembly above the opening and a handle assembly extends from each end of the frame assembly wherein the handle assembly is adapted for use as a handle and a clothes hanging device.

Still yet another object of the present invention is to provide a new Foldable Laundry Cart that can be used while sitting or standing, thus eliminating excessive bending and straining while folding and sorting laundry.

Even still another object of the present invention is to provide a new Foldable Laundry Cart that could be easily folded for storage when not in use.

Even still another object of the present invention is to provide a new Foldable Laundry Cart that could be used by people who are physically challenged and by people with limited mobility.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
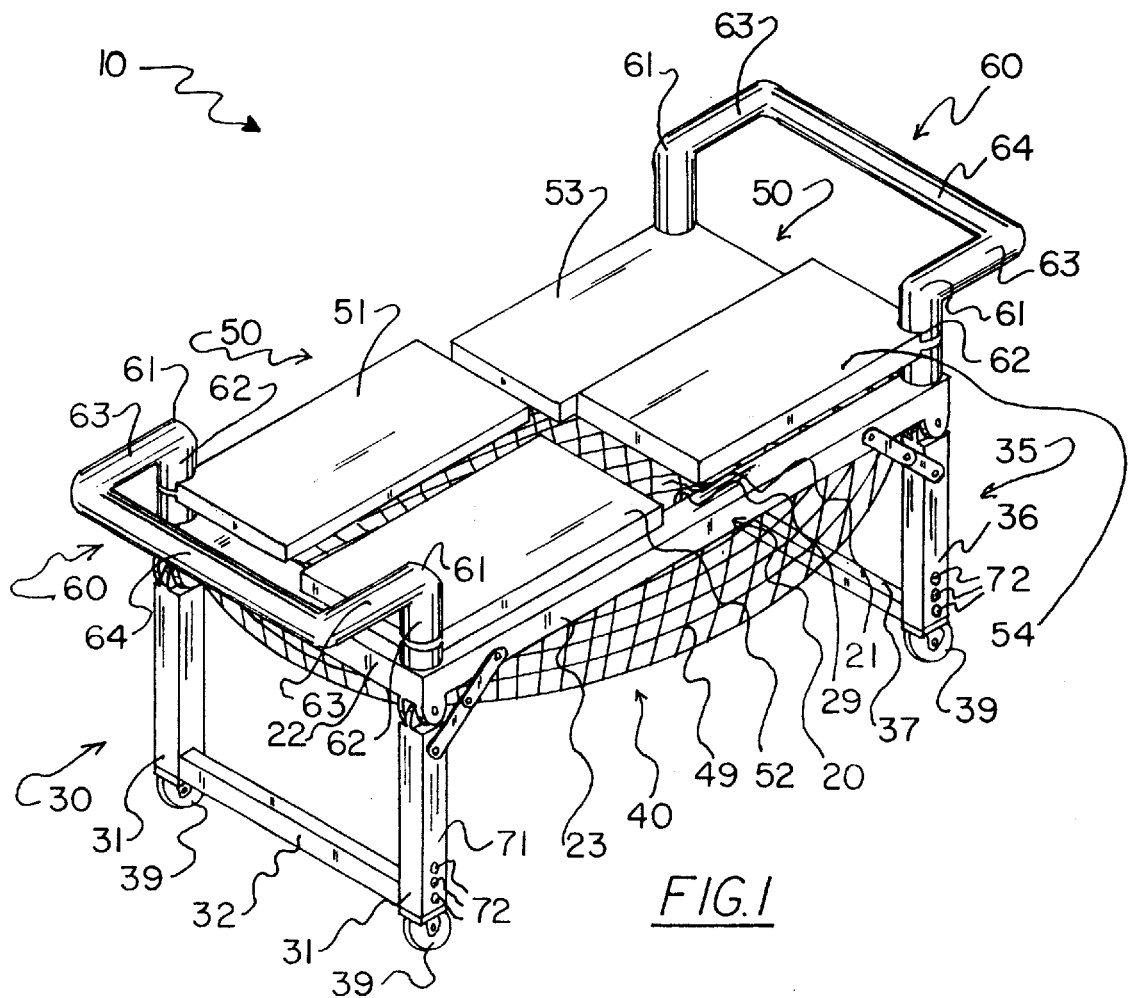
FIG. 1 is an illustration of a new Foldable Laundry Cart according to the present invention.

With reference now to the drawings, and in particular to FIGS. 1 through 7 thereof, a new Foldable Laundry Cart embodying the principles and concepts of the present invention and generally designated by the reference numeral 10 will be described.

More specifically, it will be noted that the Foldable Laundry Cart 10 comprises a frame assembly 20 having an opening 21 therein, a basket 40 fitted within the opening 21 of the frame assembly 20, and first and second leg assemblies 30 and 35 pivotally attached to opposite ends of the frame assembly 20, wherein the leg assemblies 30 and 35 are foldable toward each other to a horizontal position adjacent the underside of the frame assembly 20 whereby the cart 10 can be easily stored when not in use. A tray assembly 50 is swivelly attached to the frame assembly 20 above the opening 21 and a handle assembly 60 extends from each end of the frame assembly 20 wherein the handle assembly 60 is adapted for use as a handle and a clothes hanging device.

As best illustrated in FIGS. 1 through 5, it can be shown that the frame assembly 20 comprises a first pair of opposed frame members 22 and a second pair of opposed frame members 23, wherein the first pair of opposed frame members 22 and the second pair of opposed frame members 23 are perpendicularly joined at mating corners thereof to form a substantially rectangular-shaped frame assembly 20. The frame assembly 20 has an underside 28 and an inner surface 29. The opening 21 in the frame assembly 20 is substantially rectangular in shape.

Figure 4:
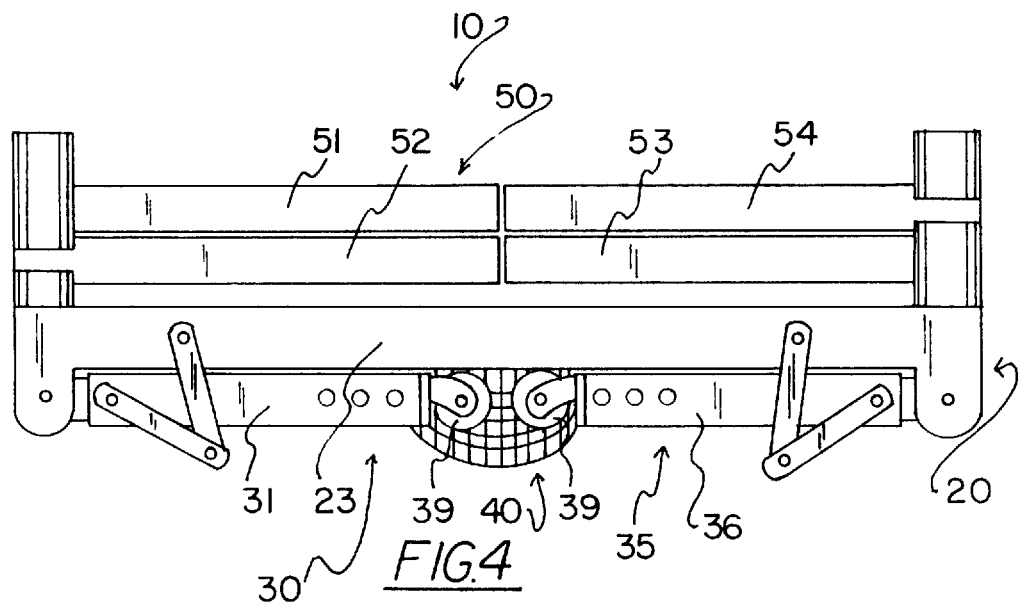
FIG. 4 is an illustration of the present invention wherein the leg assemblies are folded for storage.
Figure 6:
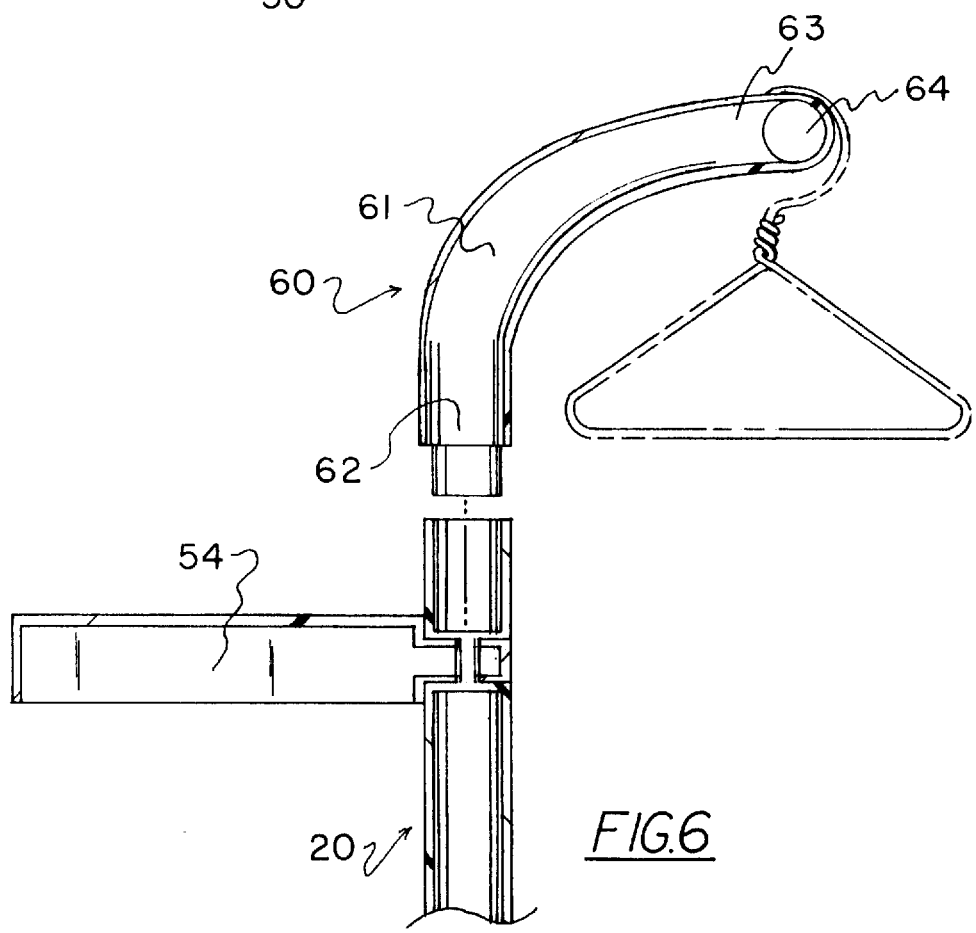
FIG. 6 is a cross sectional view taken along line 6—6 of FIG. 2.

A first leg assembly 30 is pivotally attached to one end of the frame assembly 20 and a second leg assembly 35 is pivotally attached to an opposite end of the frame assembly 20. As best illustrated in FIG. 4, it can be shown that the first leg assembly 30 and the second leg assembly 35 are foldable toward each other to a horizontal position adjacent the underside 28 of the frame assembly 20 whereby the cart 10 can be easily stored when not in use.

Figure 3:
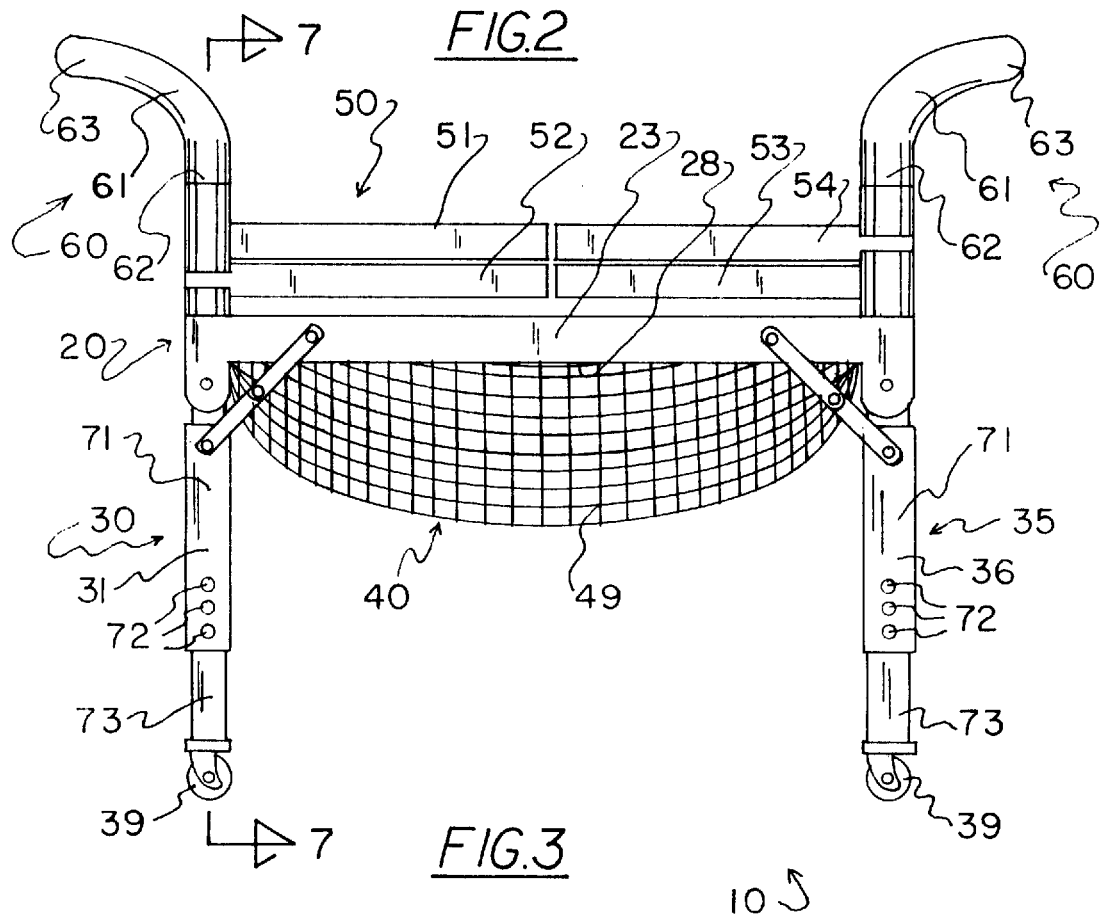
FIG. 3 is a side view of the present invention.
Figure 7:
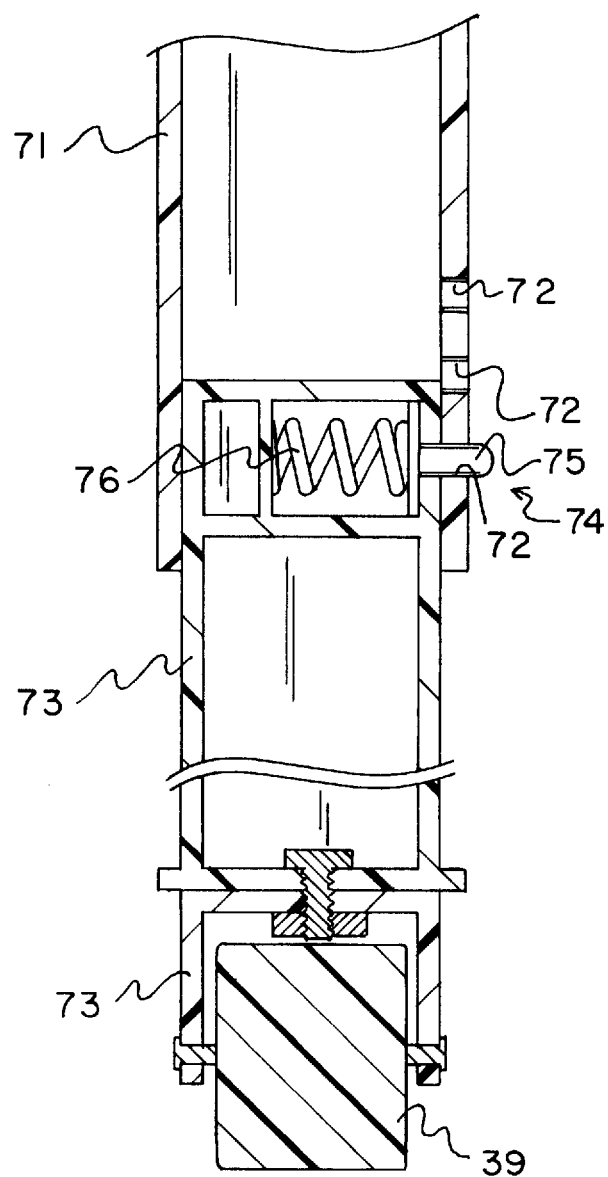
FIG. 7 is a cross sectional view taken along line 7—7 of FIG. 3.

As best illustrated in FIGS. 1 and 3, it can be shown that the first leg assembly 30 comprises a first pair of vertically adjustable legs 31 and the second leg assembly 35 comprises a second pair of vertically adjustable legs 36. As best illustrated in FIG. 7, it can be shown that each of the first pair of vertically adjustable legs 31 and each of the second pair of vertically adjustable legs 36 comprises a sleeve member 71 pivotally attached at one end to the frame assembly 20, an extension member 73 slidingly inserted within the sleeve member 71 and extending from an opposite end of the sleeve member 71, and a locking means 74 for locking the extension member 73 in a desired position. Each of the extension members 73 may be extended from the sleeve member 71 by slidingly moving the extension member 73 within the sleeve member 71.

The locking means 74 comprises a catch pin 75 projecting perpendicularly from the extension member 73 and a projection spring 76 located within the extension member 73 and positioned behind the catch pin 75 whereby the projection spring 76 causes the catch pin 75 to project perpendicularly outward from the extension member 73 and allows the catch pin 75 to be depressed into the extension member 73. Each of the sleeve members 71 has a plurality of aligned catch holes 72 therein and the catch pin 75 projects through one of the plurality of aligned catch holes 72. To adjust the length of each of the vertically adjustable legs 31 and 36, the catch pin 75 is depressed within the catch hole 72 whereby the extension member 73 may be re-positioned within the sleeve member 71.

A first cross-member 32 interconnects the first pair of vertically extendable legs 31 and a second cross-member 37 interconnects the second pair of vertically extendable legs 36. In addition, a caster 39 is provided on each of the first pair of vertically extendable legs 31 and on each of the second pair of vertically extendable legs 36, whereby the cart 10 can be easily transported.

Figure 5:
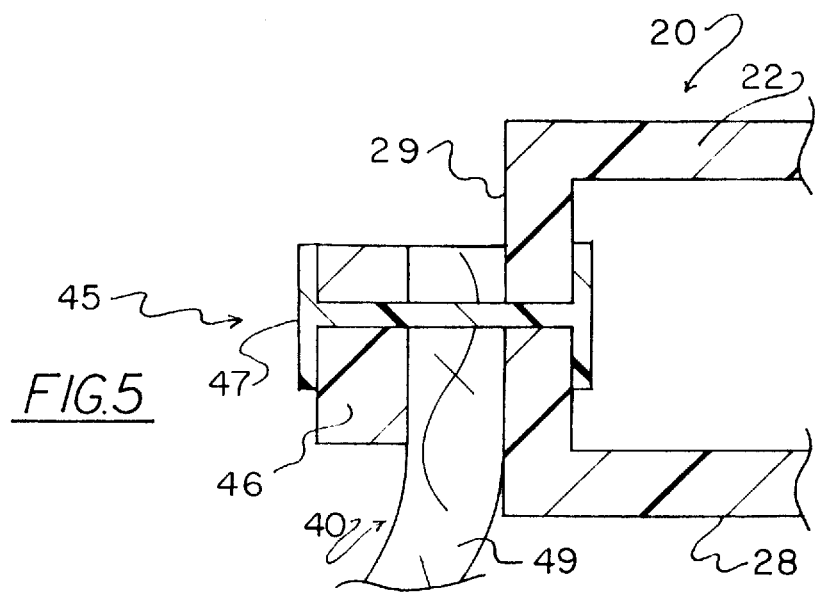
FIG. 5 is a cross sectional view taken along line 5—5 of FIG. 2.

As best illustrated in FIGS. 1 and 3, it can be shown that the basket 40 is fitted within the opening 21 of the frame assembly 20 and connected to the inner surface 29 of the frame assembly 20. A basket securing means 45 is provided for securing the basket 40 to the inner surface 29 of the frame assembly 20. As best illustrated in FIG. 5, it can be shown that the basket securing means 45 comprises a band 46, wherein the basket 40 is interposed between the band 46 and the inner surface 29 of the frame assembly 20, and a fastener 47, wherein the fastener 47 attaches the band 46 and the basket 40 to through the frame assembly 20. The basket 40 is formed of an open-mesh netting material 49.

Figure 2:
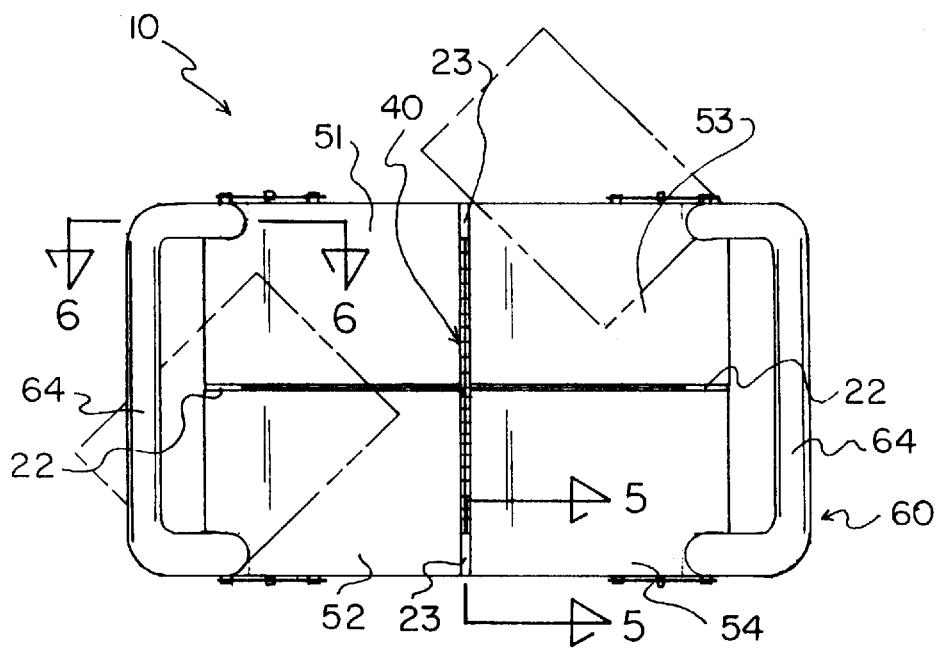
FIG. 2 is a top view of the present invention.

As best illustrated in FIGS. 1 through 3, it can be shown that the tray assembly 50 is swivelly attached to the frame assembly 20 above the opening 21 wherein the tray assembly 50 can be swiveled to reveal the opening 21 in the frame assembly 20 and the basket 40. The tray assembly 50 comprises a first tray 51 and a second tray 52 swivelly attached to the frame assembly 20 at one end, and a third tray 53 and a fourth tray 54 swivelly attached to the frame assembly 20 at an opposite end. The first tray 51 and the fourth tray 54 swivel in a first horizontal plane and the second tray 52 and the third tray 53 swivel in a second horizontal plane, wherein the first horizontal plane is above the second horizontal plane. As such, the first tray 51 and the second tray 52 may be swiveled toward each other such that the first tray 51 eclipses the second tray 52, and the third tray 53 and the fourth tray 54 may be swiveled toward each other such that the fourth tray 54 eclipses the third tray 53.

As best illustrated in FIGS. 1 through 3 and FIG. 6, it can be shown that a handle assembly 60 extends from each end of the frame assembly 20 wherein the handle assembly 60 is removably attached to the frame assembly 20. The handle assembly 60 is adapted for use as a handle and a clothes hanging device. The handle assembly 60 comprises a pair of arm portions 61 each having a first end 62 removably attached to the frame assembly 20 and a second end 63 extending upward and outward from the frame assembly 20, and a cross-member portion 64 interconnecting the second ends 63 of each of the pair of arm portions 61.

In use, the length of each of the vertically adjustable legs 31 and 36 may be adjusted by depressing the catch pin 75 within the catch hole 72 whereby the extension member 73 may be re-positioned within the sleeve member 71. The tray assembly 50 is swiveled to reveal the opening 21 in the frame assembly 20 and the basket 40. The basket 40 is then filled with clothes to be transported. The handle assembly 60 is used to push the cart 10 between rooms and to and from the laundry. The tray assembly 50 provides a surface on which clothes may be folded and stacked. The handle assembly 60 provides a clothes hanging device from which clothes may be hung from a clothes hanger. When the cart 10 is not in use, the handle assembly 60 may be removed from the frame assembly 20 and the first and second leg assemblies 30 and 35 may be folded toward each other to a horizontal position adjacent the underside 28 of the frame assembly 20 whereby the cart 10 can be easily stored.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A laundry cart comprising:

a frame assembly having an opening therein;

a basket fitted within said opening of said frame assembly and attached to said frame assembly;

a first leg assembly pivotally attached to one end of said frame assembly;

a second leg assembly pivotally attached to an opposite end of said frame assembly;

a tray assembly swivelly attached to said frame assembly above said opening of said frame assembly;

said tray assembly swiveled to reveal said opening in said frame assembly and said basket;

a handle assembly extending from each end of said frame assembly; and said first leg assembly and said second leg assembly are foldable toward each other to a horizontal position adjacent the underside of said frame assembly, whereby said cart can be easily stored when not in use.

2. The laundry cart of claim 1, wherein said frame assembly comprises:

a first pair of opposed frame members;

a second pair of opposed frame members; and said first pair of opposed frame members and said second pair of opposed frame members perpendicularly joined at mating corners thereof to form a substantially rectangular-shaped frame assembly.

3. The laundry cart of claim 1, wherein said opening in said frame assembly is substantially rectangular in shape.

4. The laundry cart of claim 1, wherein said handle assembly comprises:

a pair of arm portions each having a first end removably attached to said frame assembly and a second end extending upward and outward from said frame assembly;

a cross-member portion interconnecting said second ends of each of said pair of arm portions; and said cross-member portion adapted for use as a handle and a clothes hanging device.

5. The laundry cart of claim 1, wherein said first leg assembly comprises a first pair of vertically adjustable legs and wherein said second leg assembly comprises a second pair of vertically adjustable legs.

6. A laundry cart comprising:

a frame assembly having an opening therein;

a basket fitted within said opening of said frame assembly and attached to said frame assembly;

a first leg assembly pivotally attached to one end of said frame assembly;

a second leg assembly pivotally attached to an opposite end of said frame assembly;

a tray assembly swivelly attached to said frame assembly above said opening of said frame assembly;

said tray assembly swiveled to reveal said opening in said frame assembly and said basket;

a handle assembly extending from each end of said frame assembly;

said first leg assembly comprises a first pair of vertically adjustable legs and wherein said second leg assembly comprises a second pair of vertically adjustable legs;

each of said first pair of vertically adjustable legs and each of said second pair of vertically adjustable legs comprises:

a sleeve member pivotally attached at one end to said frame;

an extension member slidingly inserted within said sleeve member and extending from an opposite end of said sleeve member;

said extension member adjustably extendable from said sleeve member by slidingly moving said extension member within said sleeve member; and a locking means for locking said extension member in a desired position.

7. The laundry cart of claim 6, wherein each of said sleeve members has a plurality of aligned catch holes therein, and wherein said locking means comprises:

a catch pin projecting perpendicularly from said extension member, said catch pin projecting through one of said plurality of aligned catch holes; and a projection spring located within said extension member and positioned behind said catch pin whereby said projection spring causes said catch pin to project perpendicularly outward from said extension member and allows said catch pin to be depressed into said extension member.

8. The laundry cart comprising:

a frame assembly having an opening therein;

a basket fitted within said opening of said frame assembly and attached to said frame assembly;

a first leg assembly pivotally attached to one end of said frame assembly;

a second leg assembly pivotally attached to an opposite end of said frame assembly;

a tray assembly swivelly attached to said frame assembly above said opening of said frame assembly;

said tray assembly swiveled to reveal said opening in said frame assembly and said basket;

a handle assembly extending from each end of said frame assembly;

said first leg assembly comprises a first pair of vertically adjustable legs and wherein said second leg assembly comprises a second pair of vertically adjustable legs;

a first cross-member interconnecting said first pair of vertically extendable legs; and a second cross-member interconnecting said second pair of vertically extendable legs.

9. The laundry cart of claim 8, further comprising:

a caster provided on each of said first pair of vertically extendable legs and on each of said second pair of vertically extendable legs, whereby said cart can be easily transported.

10. The laundry cart of claim 4, wherein said basket is formed of an open-mesh netting material.

11. The laundry cart of claim 4, wherein said tray assembly comprises:

a first tray and a second tray swivelly attached to said frame assembly at one end; and a third tray and a fourth tray swivelly attached to said frame assembly at an opposite end.

12. The laundry cart of claim 11, wherein said first tray and said fourth tray swivel in a first horizontal plane, and wherein said second tray and said third tray swivel in a second horizontal plane, said first horizontal plane being above said second horizontal plane, said first tray and said second tray swivelable toward each other such that said first tray eclipses said second tray, said third tray and said fourth tray swivelable toward each other such that said fourth tray eclipses said third tray.

13. The laundry cart of claim 4, wherein said handle assembly is removably attached to said frame assembly.

* * * * *